United States Patent [19]

Lindblad

[11] 3,955,056

[45] May 4, 1976

[54] SAFETY BELT BUCKLE PROVIDED WITH ELECTRIC CONTACT

[76] Inventor: Stig Martin Lindblad, 440 20 Vargarda, Sweden

[22] Filed: Mar. 18, 1974

[21] Appl. No.: 451,905

Related U.S. Application Data

[63] Continuation-in-part of Ser. No. 273,777, July 21, 1972, abandoned.

[30] Foreign Application Priority Data

Aug. 3, 1971 Sweden.................................. 9905/71

[52] U.S. Cl. ..................... 200/61.58 B; 180/82 C; 24/230 A; 24/230 AL
[51] Int. Cl.² ..................... H01H 3/16; A44B 11/26; B60Q 1/00
[58] Field of Search ...... 200/16 A, 61.58 B, 67 AA, 200/61.71–61.75, 277, DIG. 54, DIG. 55, 260; 180/82 C; 280/150 SB; 307/10 SB; 340/52 E; 24/230 A, 230 AL, 230 AN

[56] References Cited
UNITED STATES PATENTS

| 3,074,055 | 1/1963 | Rudolph et al. ....... 200/61.58 B UX |
|---|---|---|
| 3,142,187 | 7/1964 | Kane et al. .................... 200/16 A X |
| 3,209,088 | 9/1965 | Wanlass et al. ................. 200/260 X |
| 3,269,483 | 8/1966 | Garner, Jr. ............... 200/61.58 B X |
| 3,681,547 | 8/1972 | Burch et al. ..................... 200/277 X |
| 3,756,339 | 9/1973 | Cornelison, Jr. et al. ......... 180/82 C |
| 3,763,523 | 10/1973 | Lindblad ......................... 24/230 AL |
| 3,766,612 | 10/1973 | Hattori ................ 200/61.58 B UX |
| 3,770,919 | 11/1973 | Lewis ........................... 200/61.58 B |
| 3,806,867 | 4/1974 | Quantz.......................... 180/82 C X |

*Primary Examiner*—James R. Scott
*Attorney, Agent, or Firm*—Ulle C. Linton

[57] ABSTRACT

The present invention relates to a buckle for safety belts which buckle comprises a buckle casing connected with one of the belt pulling elements which casing is provided with a spring biased detent lock and a tongue connected with the other pulling element of the belt, which tongue is provided with a slit and introduceable in the casing. The buckle has an electric switch by means of which a band roll, signal arrangements or similar are controlled, which control depends upon the state of the tongue relative to the buckle casing.

3 Claims, 11 Drawing Figures

– 3,955,056 –

SAFETY BELT BUCKLE PROVIDED WITH ELECTRIC CONTACT

RELATED APPLICATION

The present application is a continuation-in-part of my abandoned application Ser. No. 273,777 filed July 21, 1972 now abandoned.

SUMMARY OF THE INVENTION

It is the principal object of the invention to provide a buckle of the kind mentioned which is provided with an electric switch by means of which a band roll, signal arrangements or the like are controlled. The above mentioned switch is provided with contact means, interconnected in an electric circuit together with the devices being controlled and arranged to be actuated by the tongue so as to be closed in a diisconnected state of the buckle, interrupted in the normally connected state of the buckle and closed in a connected state of the buckle with the tongue pressed inwards further than for the normally connected state. The controlled device is in its locking position in the open condition of the switch and in its unlocked position in the closed position of the switch.

Figure 1:
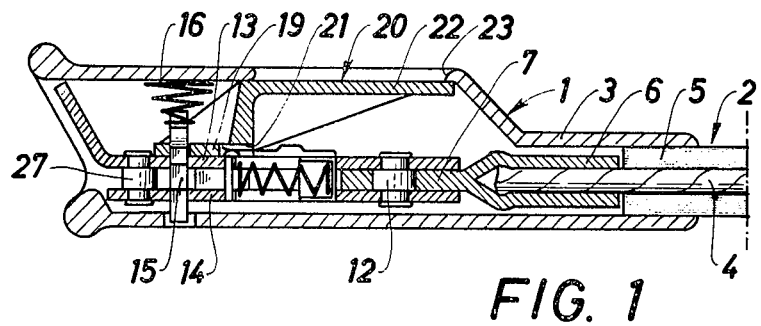
FIG. 1 is a longitudinal sectional view of one part of a buckle according to the present invention.
Figure 2:
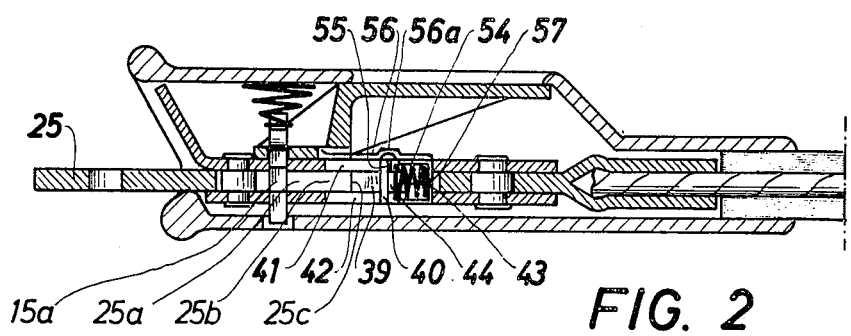
FIG. 2 is a longitudinal sectional view with both parts of the buckle attached.

In the drawing a buckle casing 1 has a sleeve 3 threaded over one, of two pulling elements 2 entering into the safety belt assembly. The pulling element 2 comprises a core in the shape of a steel wire 4 provided with a flexible plastic cover 5. A metal sleeve 6 is attached to the steel wire 4 with metal sleeve 6 continuing as a plate 7. The other end of the pulling element 2, by way of example, can be provided with a suitable fitting serving the purpose of being connected to the floor or tunnel of the driving shaft of the vehicle. The plate 7 of the sleeve 6 is connected with two guiding plates 13 and 14 by means of a rivet 12. A locking device 15 is journalled in the two guiding plates 13 and 14 and displaceable against the bias of a spring 16. The locking device 15 has the shape of a plate which includes a number of portions of varying width. Both the guiding plates 13 and 14 are further connected by means of a rivet 27 in addition to the rivet 12. A second pulling element (not shown) of the safety belt is connected with a tongue 25 which in FIG. 2 is shown in the position where it is introduced into the buckle casing 1 and coupled together with the same to open switch 58. In the front part, the tongue 25 can be provided with a slit 25a tapering in the direction away from its free end which slit continues into a widened portion, the width of which is greater than the portion between edges 15a of the locking device 15 located between the guiding plates 13 and 14 as seen in the direction of width of the guiding plates. When introducing the tongue 25 between the guiding plates 13 and 14 the oblique edges 25b of the slit will slide against the corresponding oblique edges 15a of the locking device 15, whereby the device is lifted up causing the spring 16 to be compressed and after the oblique edges 25b of the slit 25a having passed the locking device, the same is pressed down in the widened portion of the slit by the action of the spring 16, thereby locking the tongue 25 in the buckle casing 1. A bar 39 extends displaceably guided between the guiding plates 13 and 14 as seen in the direction of the width of the plates which bar 42 has guiding portion 40 which extend into the slits 41 and 42 of the guiding plates 13 and 14 respectively. The bar 39 is made of electroinsulated material by way of example a plastic. Against the side 39a of the bar which is turned away from the tongue 25, a pressure spring 43 is positioned which via the bar 39 provides an outwardly directed bias on the tongue in the coupling position thereof illustrated in FIG. 2. At the introduction of the tongue 25 the same contacts with its front surfaces 25c the bar 39, thereby pressing it inwards biassing the spring 43. A portion of the locking device 15 rests upon one leg 19 of a Z-shaped releasing arm 20 which lies against the plate 13 and which for the purpose of releasing the lock is tiltably arranged relative to the plate around an edge 21 extending at a right angle to the direction of pulling of the belt. The other leg 22 of the Z-shaped arm 20 serves the purpose of a pressure plate which is located within the buckle casing 1 and accessible through an opening 23 in the wall of the same, so that the leg substantially closes the opening. If the operating plate 22 is subjected to a pressure the releasing arm tilts around the edge 21 and thereby displaces the locking device 15 in upwards direction to the releasing position. During the releasing operation the bar 39 serves to push out the tongue 25.

The above mentioned electric switch includes the spring 43 as a switching and electrically conducting member, one end of which is inserted in the sleeve 54, made of electrically insulating material, for example plastics and provided with a bottom. The other end of the spring 43 contacts a cotter pin 55 extending through the bar 39 in its transversal direction which cotter pin is arranged in such a manner that it is in mechanical contact with the spring 43. the cotter pin 55 serves as a contact means of the switch, whereas the spring 43 is electrically insulated from other metallic parts of the buckle. The spring contact sheet piece 56 is inserted between the bottom of the sleeve 54 and the limiting rear edges of the slits 41 and 42 and is in electrical conduction with said edges. One end of that electrical circuit, which the electrical switch in the buckle is intended to close and open alternatively, is indicated at 57a and is connected with one end of the spring 43 inside the sleeve 54 by an electric conductor 57. A pressed up portion of the contact sheet piece 56 is indicated at 56a. In the disconnected state with the tongue 25 released from the casing 1, illustrated in FIG.

Figure 3:
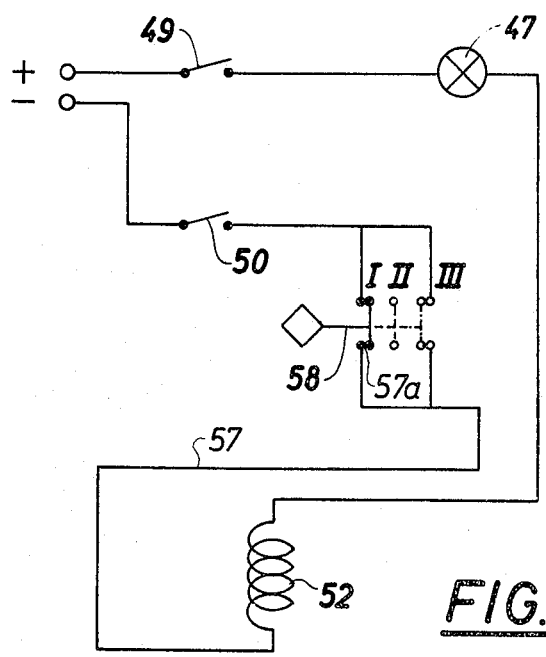
FIG. 3 is a circuit diagram belonging to the embodiment illustrated in FIGS. 1 and 2.
Figure 4:
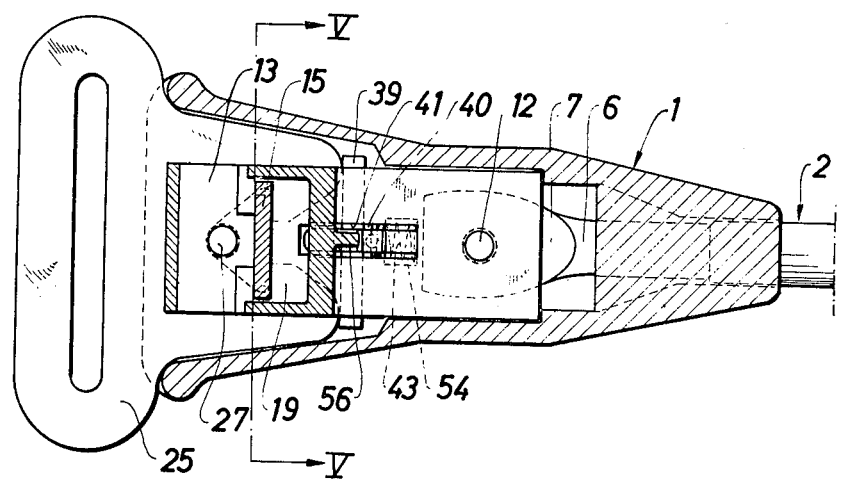
FIG. 4 is an enlarged lateral sectional view of the attached buckle.
Figure 5:
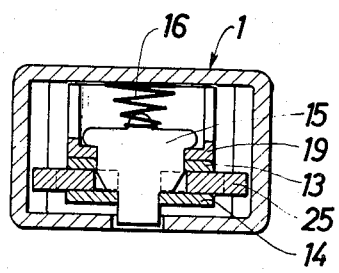
FIG. 5 is a cross sectional view taken on line V—V of FIG. 4.
Figure 6:
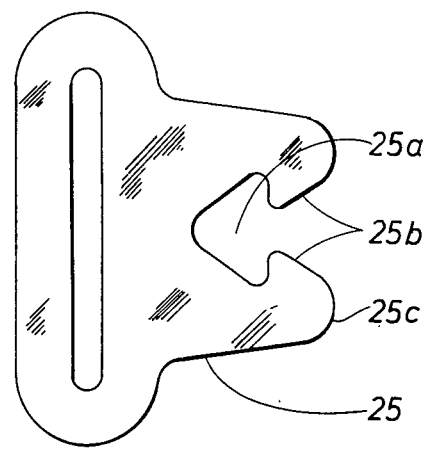
FIG. 6 is a top view of the tongue for connecting one end of the belt to the buckle.
Figure 7:
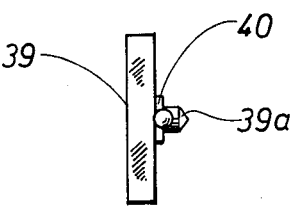
FIG. 7 is a top view of a guide bar.
Figure 8:
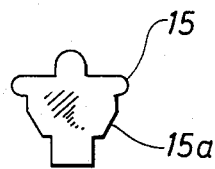
FIG. 8 is a side view of a locking device.
Figure 9:
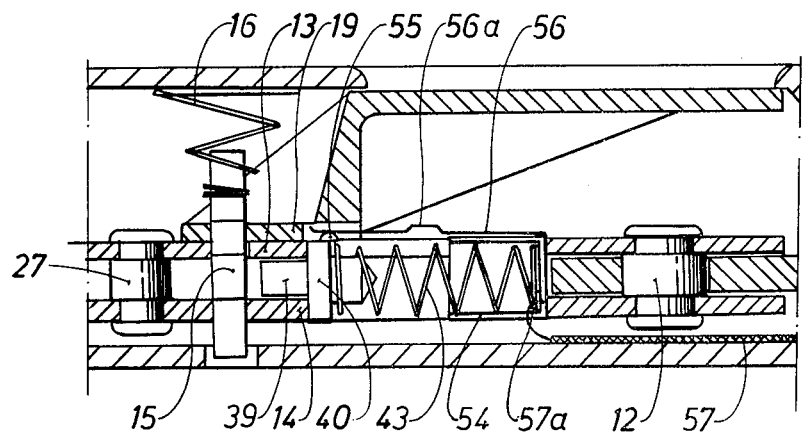
FIG. 9 is a partial sectional view of the buckle with the tongue released from the casing closing the switch.
Figure 10:
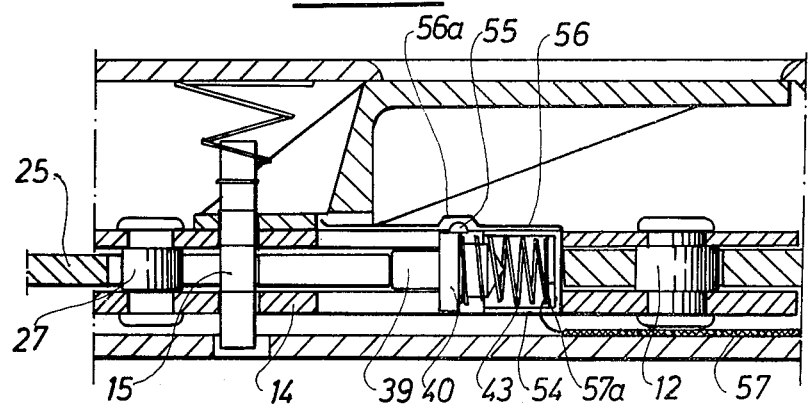
FIG. 10 is a view similar to FIG. 9, but with the tongue initially inserted in the casing opening the switch, and, FIG. 11 is a view similar to FIG. 10, but with the tongue inserted further in the casing again closing the switch.
Figure 11:
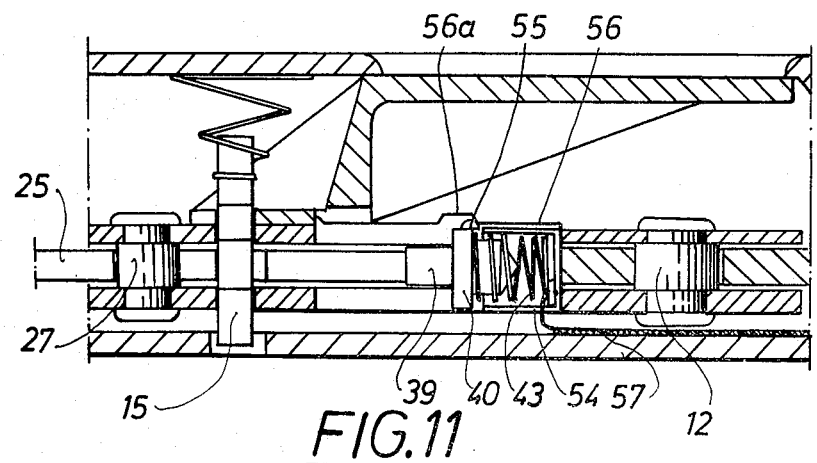

1, the pin 55 is in contact with the free end portion of the contact sheet piece 56 and thus connects this with the circuit 57 via the spring 43, thereby closing the electrical circuit. In the normally connected state of the buckle, illustrated in FIG. 2, the pin 44 is below the pressed up portion 56a and consequently the circuit is broken. When the tongue 25 is still further moved inwards against the bias of the force from the spring 43, the upper end of the pin 55 again gets in contact with the contact sheet piece 56. Thus the circuit is closed via the electrical conductor 57, the spring 43, the cotter pin 55, the contact sheet piece 56, and the steel wire 4 to the frame of the car to which one pole of the battery normally is connected. In FIG. 3 the entire switch is formed by the buckle as indicated at 58. The switch 58 thus can occupy three positions, of which one is indicated at I, the second one at II, and the third one at III. Position I occurrs when the buckle is disconnected, position II occurrs when the buckle is in the connected state illustrated in FIG. 2, and position III occurrs when the tongue 25 is pressed inwards still further in the buckle. When the switch 58 is in position I, i.e. the buckle is not connected and the switches 49 and 50 are closed, the circuit through the signalling device 47 is closed and attention is called to the person using the seat in question that the belt is not being used. Possibly one further circuit 51 has a coil 52 in the winding mechanism entering into the belt assembly which can be used. In this latter case the portion 57a of the circuit is omitted. When the switches 49 and 50 are closed and the switch 58 is in position I, i.e. the buckle is disconnected, a current flows through the coil 52 which means that the band of the belt can be unwound from the winding device. When the buckle is connected and the switch 58 is in position II, i.e. the current through the coil 52 is broken, the band is locked. Should it be necessary to lean forwards more than what the belt normally permits, the band can be released by pressing the tongue 25 further inwards and the circuit through the coil 52 is closed, which means that it releases the locking device of the roll.

The invention is not limited to the embodiment described above and illustrated in the drawing by way of example only, but can be varied as to its details within the scope of the claims.

I claim:

1. A safety belt buckle comprising a buckle casing to be connected to one part of the safety belt assembly, a spring loaded locking member moveably mounted in said buckle casing, a tongue connected to another part of the safety belt, said tongue being insertable into said buckle casing and having a configuration whereby said tongue moves said member against the action of its spring until said locking member snaps into its locking position in and retains said tongue, manually operable means being provided for moving said locking member to release said tongue, spring biasing means capable of ejecting said tongue when released from said buckle casing, an electric switch in said buckle casing comprising a first electric contact member being moveably positioned for being moved between three positions by said tongue and said spring biasing means, a second contact member being fastened to said buckle casing, electric insulating means electrically insulating said first electric contact member from said buckle casing, a first position of said three positions having said two contact members interconnected when said tongue is in its released position, a second of said positions having said two contact members disconnected when said tongue is in its normal locked position and a third of said positioned having said two contact members being interconnected when said tongue is pressed further inwards against said spring biasing means.

2. A buckle as claimed in claim 1, wherein said electrically insulating means constitutes a first movable insulating member carrying said movable contact member and being located between said tongue and one end of said spring biasing means, and a second insulating member enclosing said spring biasing means which is electrically connected to said first contact member and an electrical terminal is connected to electric switch.

3. A buckle as claimed in claim 2, wherein said second contact member is constituted by an elongated spring plate extending in the movement direction of said tongue, said first contact member is positioned for being movable along the length of the first of said contact members and having a short extension in said movement direction, and the contact surface of said spring contact plate having a configuration such that it will engage and disengaged with said first contact member in accordance with the position of the same.

* * * * *